US012775713B2

(12) United States Patent
Da Silva et al.

(10) Patent No.: US 12,775,713 B2
(45) Date of Patent: Oct. 27, 2026

(54) METHOD AND DEVICE FOR IDENTIFYING RISKS OF CYBERATTACKS

(71) Applicants: Commissariat à l'Energie Atomique et aux Energies Alternatives, Paris (FR); Institut Polytechnique de Grenoble, Grenoble (FR); CENTRE NATIONAL DE LA RECHERCHE SCIENTIFIQUE, Paris (FR); Institut National de Recherche en Informatique et en Automatique, Le Chesnay (FR); UNIVERSITE GRENOBLE ALPES, Saint Martin d'Heres (FR)

(72) Inventors: Mike Da Silva, Grenoble (FR); Pierre-Henri Thevenon, Grenoble (FR); Maxime Puys, Grenoble (FR); Stéphane Mocanu, Biviers (FR)

(73) Assignees: Commissariat à l'Energie Atomique et aux Energies Alternatives, Paris (FR); Institut Polytechnique de Grenoble, Grenoble (FR); Centre National de la Recherche Scientifique, Paris (FR); Institut National de Recherche en Informatique et en Automatique, Le Chesnay (FR); Universite Grenoble Alpes, Saint Martin d'Heres (FR)

( * ) Notice: Subject to any disclaimer, the term of this patent is extended or adjusted under 35 U.S.C. 154(b) by 179 days.

(21) Appl. No.: 18/534,970

(22) Filed: Dec. 11, 2023

(65) Prior Publication Data

US 2024/0211607 A1 Jun. 27, 2024

(30) Foreign Application Priority Data

Dec. 21, 2022 (FR) ........................................ 2214122

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 21/577; G06F 2221/034
See application file for complete search history.

(56) References Cited

U.S. PATENT DOCUMENTS 10,445,516 B1 * 10/2019 Mao ........................ G06F 21/51
2018/0136921 A1 * 5/2018 Pfleger de Aguiar ... G06N 7/01

(Continued)

FOREIGN PATENT DOCUMENTS

CN 107491058 B 7/2019
WO 2020231334 A1 11/2020

OTHER PUBLICATIONS

Preliminary Search Report for French Application No. 2214122 dated Jun. 12, 2023, 2 pages.
Khaled, Abdelaziz, Samir Ouchani, Zahir Tari, and Khalil Drira. "Assessing the severity of smart attacks in industrial cyber-physical systems." ACM Transactions on Cyber-Physical Systems 5, No. 1 (2020): 1-28.

(Continued)

*Primary Examiner* — Linglan Edwards
*Assistant Examiner* — Kamryn J Gillespie
(74) *Attorney, Agent, or Firm* — Jordan IP Law, LLC

(57) ABSTRACT

The present description concerns a method of identification of risks of cyberattacks on a programmable logic controller, the method comprising: the generation of a digital representation of a minimized finite-state transducer based on a specification of a controller logic of the programmable logic controller, the minimized finite-state transducer comprising a set of source states, a set of destination states, and a set of transitions from a source state to a destination state based on (Continued)

an input data value; the generation of a second computer file, based on a first computer file identifying a subset of sensitive states, the second file comprising a list of critical transitions associated with the sensitive states, and for each transition, a list of the input data; and the generation of a fourth computer file indicating input data to be protected which are both associated with critical transitions and with a corruption risk.

11 Claims, 9 Drawing Sheets

(56) References Cited

U.S. PATENT DOCUMENTS

2019/0243977 A1* 8/2019 Pfleger de Aguiar ........................ G06F 21/566
2019/0317465 A1* 10/2019 Wei ........................ G06F 21/577
2020/0202008 A1* 6/2020 Pfleger de Aguiar ........................ G06F 11/3485
2021/0099424 A1* 4/2021 Li ........................ H04L 63/0227
2021/0160323 A1* 5/2021 Nassor .................... G08G 1/093
2021/0203673 A1* 7/2021 dos Santos ......... H04L 63/1408

OTHER PUBLICATIONS

McLaughlin, Stephen, and Saman Zonouz. "Controller-aware false data injection against programmable logic controllers." In 2014 IEEE International Conference on Smart Grid Communications (SmartGridComm), pp. 848-853. IEEE, 2014.

Mesli-Kesraoui, S., A. Toguyeni, A. Bignon, F. Oquendo, D. Kesraoui, and P. Berruet. "Formal and joint verification of control programs and supervision interfaces for socio-technical systems components." IFAC-PapersOnLine 49, No. 19 (2016): 426-431.

Puys, Maxime, Marie-Laure Potet, and Abdelaziz Khaled. "Generation of applicative attacks scenarios against industrial systems." In Foundations and Practice of Security: 10th International Symposium, FPS 2017, Nancy, France, Oct. 23-25, 2017, Revised Selected Papers 10, pp. 127-143. Springer International Publishing, 2018.

Monzer, Mohamad-Houssein, Kamal Beydoun, Alaa Ghaith, and Jean-Marie Flaus. "Model-based IDS design for ICSs." Reliability Engineering & System Safety 225 (2022): 108571.

* cited by examiner

METHOD AND DEVICE FOR IDENTIFYING RISKS OF CYBERATTACKS

FIELD

The present disclosure generally concerns the field of the cybersecurity of industrial systems.

BACKGROUND

An industrial system generally partly integrates a plurality of programmable logic controllers (PLC) configured to, for example, operate actuators of an operational portion of the industrial system.

On the one hand, the safety of the industrial system (protection of the people, of the environment, of the goods and of the service provided) is ensured by operational technologies such as hardware and/or software solutions monitoring and controlling processes and devices of the industrial system.

On the other hand, the security of the industrial system (protection of the integrity, of the confidentiality, and of the availability of the data) is controlled by information technologies, for example requiring cybersecurity techniques.

However, the interconnection of information technologies and of operational technologies increases the attack surface of industrial systems.

Industrial systems being more and more frequently attacked, there exists a technical need to have the analysis of the safety and of the security of said systems converge.

SUMMARY

An embodiment provides a method of identification of risks of cyberattacks on a programmable controller, the method being implemented by a data processing device comprising a processing unit and a memory, the method comprising:

- the generation, by the device, of a digital representation of a minimized finite-state transducer based on a specification of a controller logic of the programmable logic controller, the minimized finite-state transducer comprising a set of source states, a set of destination states, and a set of transitions, each transition starting from a source state to a destination state based on an input data value;
- the generation and the storage into the memory of a second computer file, based on a first computer file identifying a subset of sensitive states among the set of states, the second file comprising a list of critical transitions associated with the sensitive states, and for each transition, a list of the input data; and
- the generation and the storage into the memory of a fourth computer file, based on a third computer file indicating the presence or not of a risk of corruption on at least each input data element contained in the second file, the fourth file indicating, among the input data, input data to be protected which are both associated with critical transitions and with a corruption risk, these input data being at risk for a cyberattack.

According to an embodiment, the generation of the second computer file comprises:

- the identification in the digital representation of the minimized finite-state transducer, by a processing unit of the device, of first transitions from a source state not identified as sensitive, in the first computer file, to a destination state identified as sensitive; and
- the writing into the second file of the first transitions.

According to an embodiment, the generation of the second computer file further comprises:

- the identification in the finite-state transducer, by the processing unit, of second transitions from a source state identified as sensitive in the first computer file to a destination state not identified as sensitive; and
- the writing into the first file of the second transitions.

According to an embodiment, the generation of the second computer file further comprises:

- for each first transition, the identification, by the processing unit of the device, in the digital representation of the minimized finite-state transducer, of first input data having a blocking of their value inhibiting the transition to the associated destination state; and
- the writing into the second file of the first input data.

According to an embodiment, the generation of the second computer file further comprises:

- for each second transition, the identification in the digital representation of the minimized finite-state transducer, of second input data having a modification of their value, in the associated source state, causing said second transition.

According to an embodiment, the identified risk associated with an element of the second file, in the third file, takes the form of an indication value coded over at least 2 bits.

According to an embodiment, the value of a bit of the indication value indicates whether a blocking of the value of the input data element inhibits a transition among the first transitions and the value of another bit of the indication value indicates whether a modification of the value of the input data element causes a transition among the second transitions.

According to an embodiment, the least significant bit of the value indicates whether a blocking of the value of the input data element inhibits a transition among the first transitions and the most significant bit indicates whether a modification of the value of the input data element causes a transition among the second transitions.

According to an embodiment, the above method further comprises a risk analysis, the analysis comprising, for each element of the fourth computer file:

- the identification, by the processing unit, of a feared event occurring in case of an attack on the element;
- the calculation, by the processing unit, of a probability of occurrence of the event;
- the determination, by the processing unit, of a risk level based on a severity value and on the probability.

According to an embodiment, the probability of a feared event is equal to the inverse of the number of elements of the fourth file for which the feared event is identified.

According to an embodiment, the level of risk of a feared event is equal to the product of the probability of the event and of its severity value.

An embodiment provides a non-transient memory configured to store instructions configured to implement the method of identification of the above risks of cyberattacks when they are executed by a processing unit.

An embodiment provides a data processing device comprising a processing unit and a memory, the device being configured to implement the method of identification of risks of cyberattack.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which:

FIG. 8 shows example of attacks on the programmable logic controller; and

DETAILED DESCRIPTION OF THE PRESENT EMBODIMENTS

Figure 1:
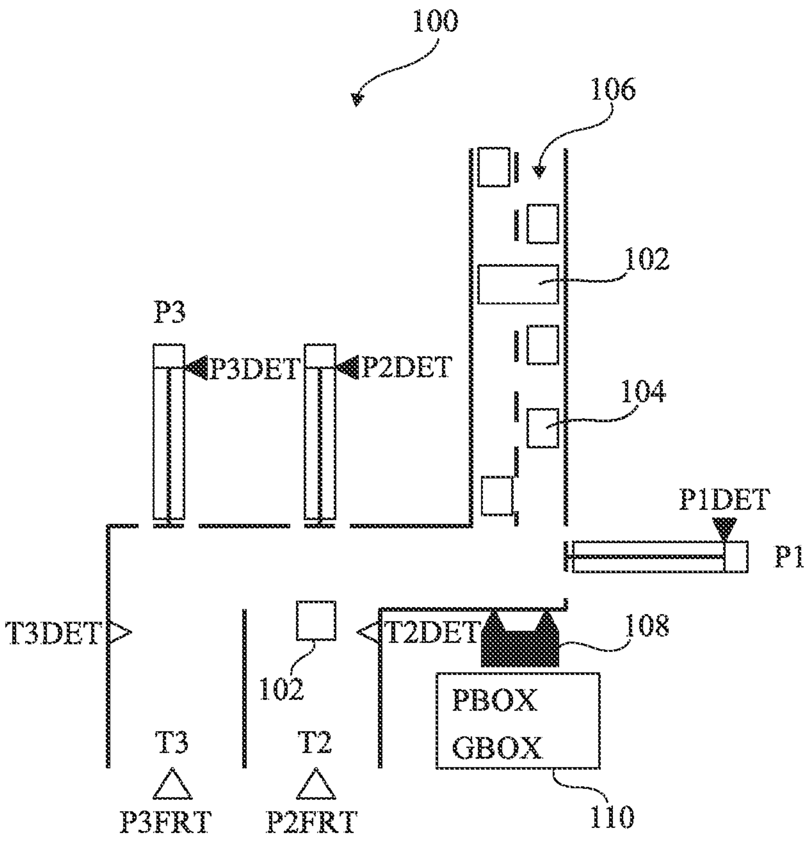
FIG. 1 is a diagram of a physical method.

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the hierarchical structure of an industrial system as well as the methods of conversion of a controller logic into one or a plurality of finite-state transducers are not described.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "edge", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

In the rest of the description, a programmable logic controller (PLC) refers to an electronic digital programmable device configured to control industrial processes by a sequential processing. As an example, a programmable logic controller is configured to control the execution of the actuators, belonging to an operational portion of an automated system, based on data for example transmitted by a sensor and/or a detector, on set points, and on a computer program.

In the rest of the description, a controller logic refers to a computer file comprising a description defining the expected behavior of a programmable logic controller. A controller logic is described in the form of specification logic, such as for example the Grafcet language or in the form of implementation programs, such as for example the Ladder language.

In the rest of the description, a finite-state transducer fait refers to a finite automaton delivering one or a plurality of output signals. Generally, a finite-state transducer is characterized by a set E of the states of the transducer, set E having a finite cardinal, and by a set T of the transitions between two states, which may be distinct or not, belonging to set E. Any transition $t \in T$ couples a state, called source state, to a state, called destination state. Each transition $t \in T$ is further associated with an input/output pair, for example expressed in the form of Boolean functions or of a bit sequence.

A finite-state transducer is here defined as minimum if its number of transitions between states is minimum. The minimizing of a transducer then consists of minimizing the number of transitions, as well as their number of inputs. Thus, each Boolean function expresses a transition with a minimum input number.

FIG. 1 is an example of an operational portion 100 of an industrial system controlled by a controller logic. More precisely, in the example of FIG. 1, the controller logic has the function of controlling the sending of boxes 102 and 104 arriving on a conveyor belt 106 to conveyor belts T2 or T3, according to their size. Boxes 102 are for example boxes of small size and are directed towards conveyor belt T2 while boxes 104 are, for example, boxes of greater size and are directed towards conveyor belt T3. A detector 108 is configured to determine the size of a box passing in front of it. As an example, detector 108 is further configured to activate a Boolean variable PBOX when it detects the passing of a box 102 and to activate a Boolean variable GBOX when it detects the passing of a box 104. As an example, Boolean variables PBOX and GBOX are stored in a volatile memory 110 of the programmable logic controller.

The operational portion further comprises a piston P1 configured to be activated when detector 108 detects the passing of a box 102 or 104. In the example illustrated in FIG. 1, piston P1 is configured to push boxes 102 and 104 leftwards. In the following, when a piston has been activated, it will be said that it is in front position, and when it is deactivated, that it is in back position.

Operational portion 100 further comprises a detector P2FRT configured to determine whether the box pushed by piston P1 is aligned in front of conveyor belt T2. The controller logic is then configured to, for example in the case where variable PBOX is activated, stop piston P1 and activate a piston P2, positioned to face conveyor belt T2, in order to push the box onto conveyor belt T2. The controller logic is further configured in order, if for example variable GBOX is activated, not to control the stopping of piston P1. When a piston having been activated is stopped, its position remains the front position. Only the deactivation has the position of a piston return to the back position.

Operational portion 100 for example further comprises a detector P3FRT, for example configured to detect when a box is aligned in front of conveyor belt T3. The controller logic is then configured to control the stopping of piston P1 when detector P3FRT detects the passing of a box and to activate a piston P3, for example facing conveyor belt T3.

As an example, operational portion 100 further comprises sensors P1DET, P2DET, and P3DET, respectively configured to detect when pistons P1, P2, or P3 are in front position. The controller logic is for example configured to, for example after a time period, control the deactivation of an activated piston.

As an example, operational portion 100 further comprises sensors T2DET and T3DET configured to detect the passing of a box on conveyor belt T2 or on conveyor belt T3.

As an example, the measurements taken by the different described sensors take the form of Boolean variables, taking value TRUE or FALSE. For example, variable PBOX takes value TRUE if the box detected by detector 108 is a small box. Variables P2_FRONT and P3_FRONT for example take value TRUE when, respectively, detectors P2FRT and P3FRT detect the passing of a box. Similarly, variables P1_BACK, P2_BACK, and P3_BACK take value TRUE when respectively detectors P1DET, P2DET, and P3DET detect that the concerned piston is in back position.

Figure 2:
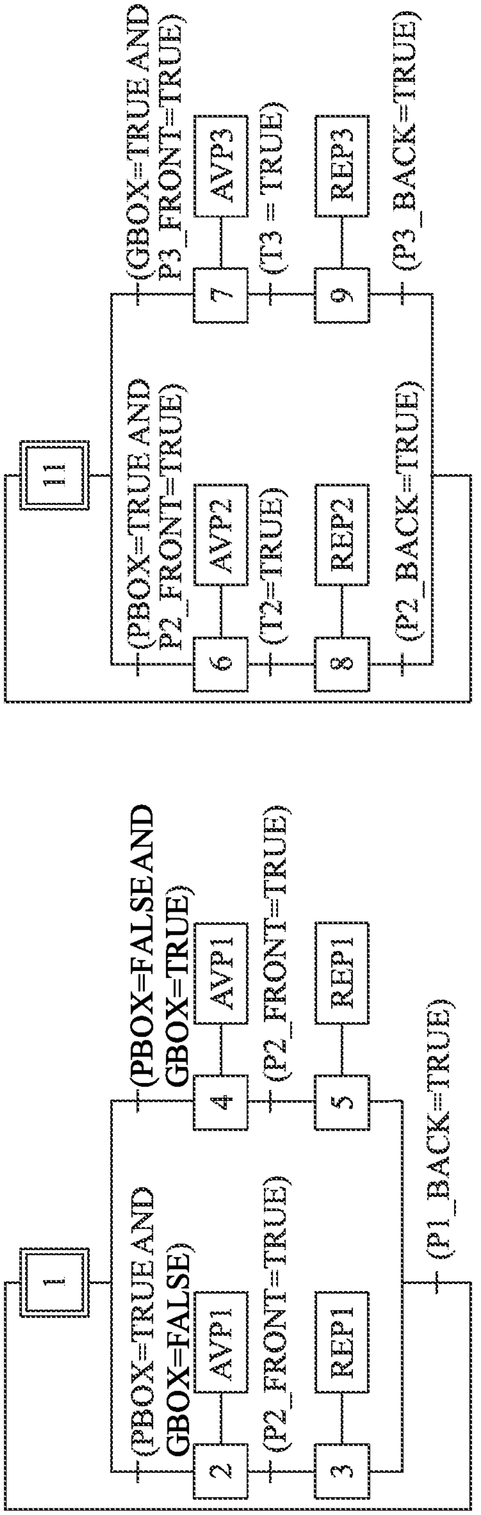
FIG. 2 schematically illustrates an example of a controller logic defining the behavior of the programmable controller of FIG. 1.

FIG. 2 illustrates an example of a controller logic describing the programmable logic controller of FIG. 1. More particularly, FIG. 2 illustrates a functional diagram 200 of Grafcet (Graphe Fonctionnel de Commande des Etapes et Transitions, functional step and transition control chart) type. Diagram 200 describes a specification language for the controller logic controlling operational portion 100.

Diagram 200 comprises two Grafcet diagrams 202 and 204. As an example, the operation of operational portion 100 is controlled by two distinct programmable logic controllers. A first programmable logic controller is described by diagram 202 and controls the operation of piston P1 and a second programmable logic controller is described by diagram 204 and controls the operation of pistons P2 and P3. As an example, the control of the pistons is performed based on the activation and/or deactivation of Boolean variables PBOX and GBOX as a result of the measurement performed by detector 108.

As an example, portion 202 comprises actions 206 (AVP1) and 208 (REP1) respectively controlling the activation and the deactivation of piston P1. Diagram 202 further comprises steps (1, 2, 3, 4, 5), action 206 being for example associated with steps 2 and 4 and action 208 being for example associated with steps 3 and 5. Step 1 for example corresponds to the measurement by detector 106 of the size of a box. The measurement of the box causes for example the activation and/or deactivation of Boolean variables PBOX and GBOX.

Diagram 202 comprises conditions (PBOX=TRUE), (GBOX=TRUE), condition (PBOX=TRUE) corresponding to the configuration where value TRUE is assigned to variable PBOX. Similarly, the diagram comprises conditions (P2_FRONT=TRUE) and (P2_FRONT=FALSE), (P3_FRONT=TRUE) and (P3_FRONT=FALSE) respectively corresponding to the assigning of value TRUE, or of value FALSE to variables P2_FRONT or P3_FRONT. A condition (PBOX=TRUE AND GBOX=FALSE) is fulfilled when both conditions (PBOX=TRUE) and (GBOX=FALSE) are fulfilled. Diagram 202 indicates the passing from step 1 to step 2 when conditions (PBOX=TRUE AND GBOX=FALSE) are fulfilled, and the passing from state 1 to state 4 when condition (PBOX=FALSE AND GBOX=TRUE)) is fulfilled. In both cases, the associated action is the activation of piston P1 to push the box. In particular, the transition from step 1 to step 2 occurs when condition (PBOX=TRUE AND GBOX=FALSE) is fulfilled and condition (P2_FRONT=TRUE) is not fulfilled. As an example, if at state 1, conditions (PBOX=TRUE AND GBOX=FALSE) and (P2_FRONT=TRUE) are fulfilled, a transition from state 1 to state 3 is performed. The condition (P2_FRONT=TRUE), or (P3_FRONT=TRUE), of diagram 200, is for example fulfilled when sensor P2DEV, or P3DEV, detects the passing of the box. When condition (P2_FRONT=TRUE), or (P3_FRONT=TRUE) is fulfilled, diagram 202 indicates the passing to step 5, or 3, and the associated action is the deactivation of piston P1. Value TRUE is then assigned to variable P1_BACK. The diagram then indicates that when condition (P1_BACK=TRUE) is fulfilled, the logic resumes at step 1 for the next box. The transitions between two states of a Grafcet are described by exclusive conditions.

Diagram 204 describes the logic of pistons P2 and P3, for example following the logic controlling piston P1.

As an example, when condition (PBOX AND P2_FRONT=TRUE), or (GBOX AND P3_FRONT=TRUE), is fulfilled, diagram 204 indicates the passing to a step 6, or 7, the associated action of which is the activation of piston P2, or of piston P3. Once a condition (T2=TRUE), or (T3=TRUE), has been fulfilled, for example corresponding to the detection by conveyor belt T2, or T3, of the passing of a box, diagram 204 indicates the passing to a step 8, or 9, the associated action of which is the deactivation of piston P2, or P3. The back position sensor P2 or P3 is detected by detector P2DET or by detector P3DET and the information is for example temporarily stored in a memory of the programmable logic controller. Diagram 204 further indicates that, when detector P2DET or P3DET detects that piston P2 or P3 is in back position, the logic passes to a step 11 where the action is for example to wait for conditions (PBOX;P2_FRONT=TRUE) or (GBOX; P3_FRONT=TRUE) to be fulfilled.

Figure 3:
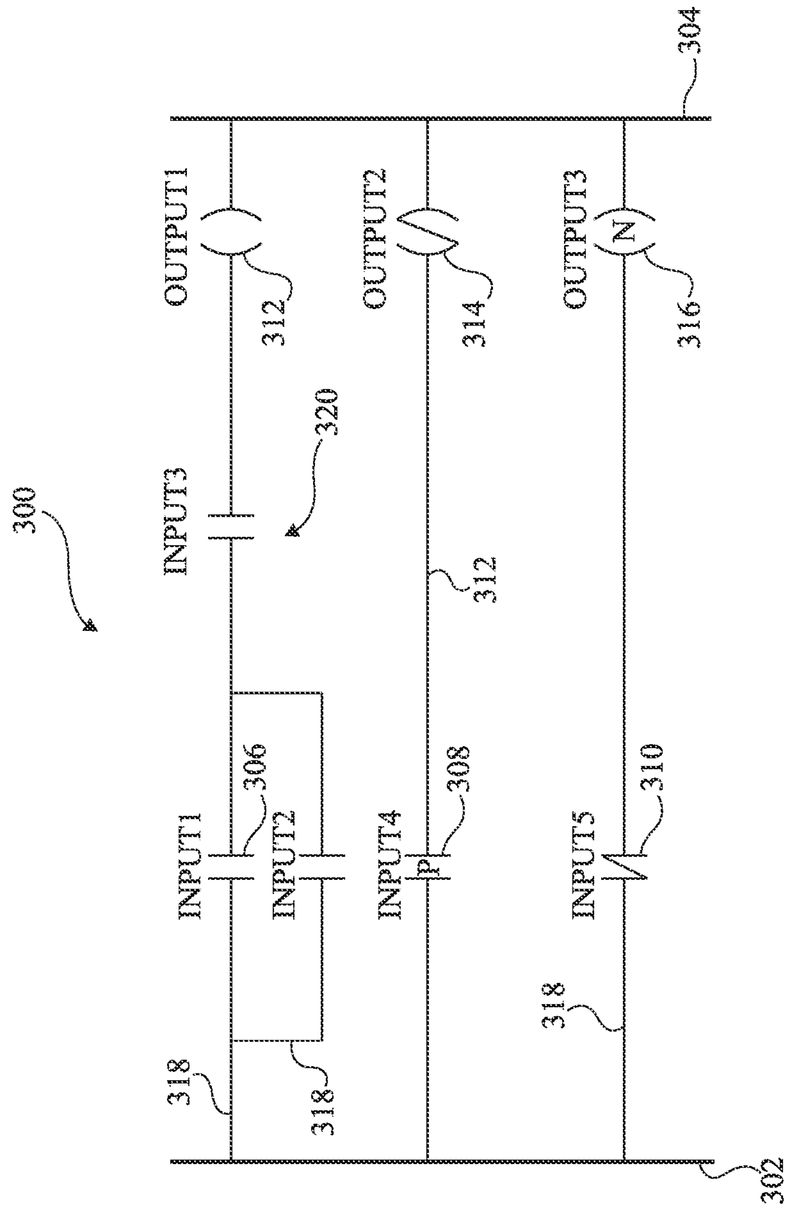
FIG. 3 schematically illustrates another example of controller logic.

FIG. 3 illustrates another example of controller logic describing the behavior of a programmable logic controller. More particularly, FIG. 3 illustrates a diagram 300 in Ladder language.

Diagram 300 combines contacts or input arguments associated with Boolean variables INPUT1, INPUT2, INPUT3, INPUT4, and INPUT5 with coils, or output results, associated with Boolean variables OUTPUT1, OUTPUT2, and OUTPUT3. Diagram 300 is limited on the left-hand side and on the right-hand side by vertical lines 302 and 304 respectively called left-hand supply bar and right-hand supply bar.

Diagram 300 comprises graphic symbols 306, 308, 310, 312, 314, and 316 coupled to supply bars 302 or 304 by link arcs 318. Each vertical link arc represents a LOGIC OR operation. Each link arc takes a Boolean state TRUE or FALSE, the Boolean state being the same on all link arcs directly connected together. The link arcs 318 coupled to supply bar 302 are at state TRUE.

As an example, symbol 306 shows a contact called direct allowing a Boolean operation between the state of the link arcs 318 which are connected thereto and Boolean variable INPUT1. The state of the link arc on the right-hand side of contact 306 is a LOGIC AND between the state of the link on the left-hand side and the value of variable INPUT1.

As an example, symbol 312 is that of a direct coil associated with an output, for example OUTPUT1.

As an example, portion 320 of diagram 300, describes that when (INPUT1=TRUE or INPUT2=TRUE) and INPUT3=TRUE, the output is OUTPUT1=TRUE. As an example, Boolean variables INPUT1, INPUT2, and INPUT3 are internal variables of a detector of an operational portion of an industrial system and output variable OUTPUT1 for example, allows the activation or not of an actuator, such as for example, a piston, a motor etc. comprised in the operational portion.

Symbol 308 for example describes a positive edge, or rising edge, detection contact. The state of the link on the right-hand side of symbol 308 is forced to value TRUE when the link on the left-hand side of symbol 308 is at state TRUE and Boolean variable INPUT4 switches from state FALSE to state TRUE. The Boolean variable associated with contact 308 is then set back to state FALSE.

Symbols 310 and 314 respectively represent an inverted contact and an inverted coil. The state of the links on the right-hand side of symbols 310 is the LOGIC AND between the state of the link on the left-hand side of the inverted symbol and of the logic inverse of the Boolean variable associated with the symbol.

Symbol 316 shows a falling edge coil. The state of the link arc on the right-hand side is forced to state TRUE when the state of the link on the left-hand side is TRUE and the state of the associated Boolean variable INPUT5 switches from FALSE to TRUE. Contact 310 thus transits from TRUE to FALSE Diagrams of Grafcet and/or Ladder type are examples of specification languages. These languages are of course non-limiting and other specification languages may be used and are known by those skilled in the art.

Figure 4:
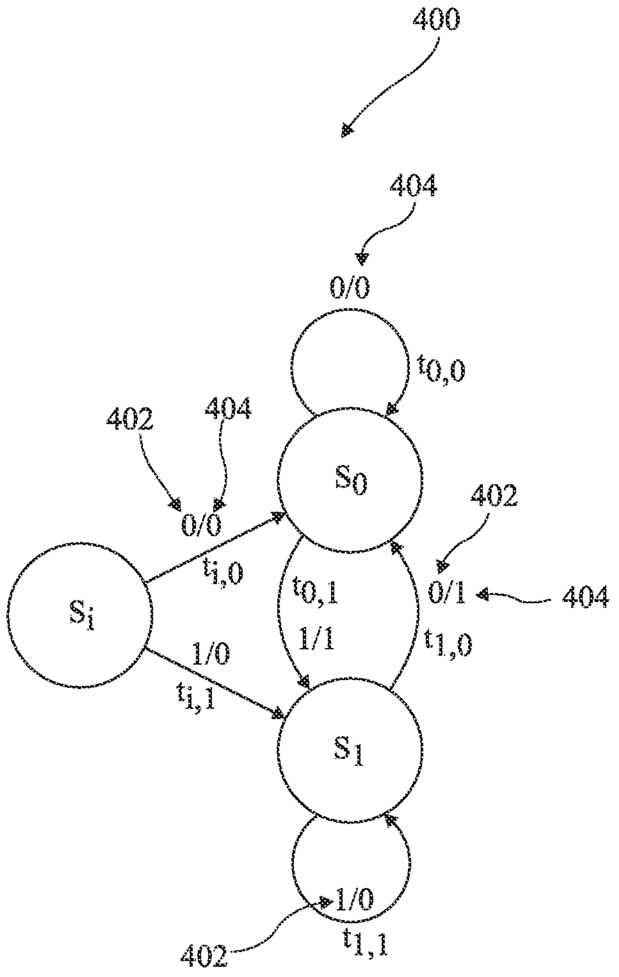
FIG. 4 is a graph illustrating an example of a finite-state transducer.

FIG. 4 is a graph 400 illustrating an example of a finite-state transducer. More particularly, the finite-state transducer is a Mealy machine.

Finite-state transducer 400 characterizes by a set of states $\{s_i, s_0, s_1\}$, state $s_i$ being the initial state of the transducer as well as a set of transitions $\{t_{i,0}, t_{i,1}, t_{0,0}, t_{0,1}, t_{1,0}, t_{1,1}\}$. Each transition $t_{k,j}$, with $k \in \{i,0,1\}$ and $j \in \{0,1\}$ couples state $s_k$, then called source state of transition $t_{k,j}$, to state $s_j$, then called destination state of transition $t_{k,j}$. A transition is performed based on an input data element 402, for example with a binary value, and generates an output data element 404, for example also with a binary value. In other examples, the inputs and/or outputs of a transducer take other forms than binary values, or bit sequences and may, for example, be Boolean variables or concatenations of binary and Boolean values.

In the example of finite-state transducer 400, the finite-state transducer takes as an input a set of bit chains, each bit representing the value of a variable, and delivers an output vector. As an example, the finite-state transducer processes the input, bit by bit, from the most significant bit to the least significant bit. If the most significant bit of the input is a 1, the transducer transits from initial state $s_i$ to state $s_1$, via transition $s_{i,1}$ and returns a 0. If the most significant bit is a 0, the finite-state transducer transits from state $s_i$ to state $s_0$ via transition $t_{i,0}$ and also returns a 0.

When the finite-state transducer is at state $s_1$, it is configured to remain in this state when the input bit is equal to 1, via transition $t_{1,1}$, and generates as an output a bit equal to 0. At state $s_1$, the finite-state transducer is further configured to transit to state $s_0$, when the input bit is equal to 0, via transition $t_{1,1}$, and generates as an output a bit equal to 1.

When the finite-state transducer is at state so, it is configured to remain in this state when the input bit is equal to 0, via transition $t_{0,0}$, and generates as an output a bit equal to 0. At state $s_0$, the finite-state transducer is further configured to transit to state $s_1$, when the input bit is equal to 1, via transition $t_{0,1}$, and generates as an output a bit equal to 1

Thus, for example, if the value of the input data element is the sequence of successive bits 011001, the transducer follows path $s_i$, $t_{i,0}$, $s_0$, $t_{0,1}$, $s_1$, $t_{1,1}$, $s_1$, $t_{1,0}$, $s_0$, $t_{0,0}$, $s_0$, $t_{0,1}$, $s_1$ and the value of the output data element is bit sequence 010101.

A state of a Mealy machine corresponds to one of the combinations of the steps of the controller logic. As an example, Boolean variables PBOX, GBOX, P2_FRONT etc. are the inputs allowing the execution of the transitions. The actions taken in the destination state, for example moving back a piston, are the outputs of the transitions.

Figure 5:
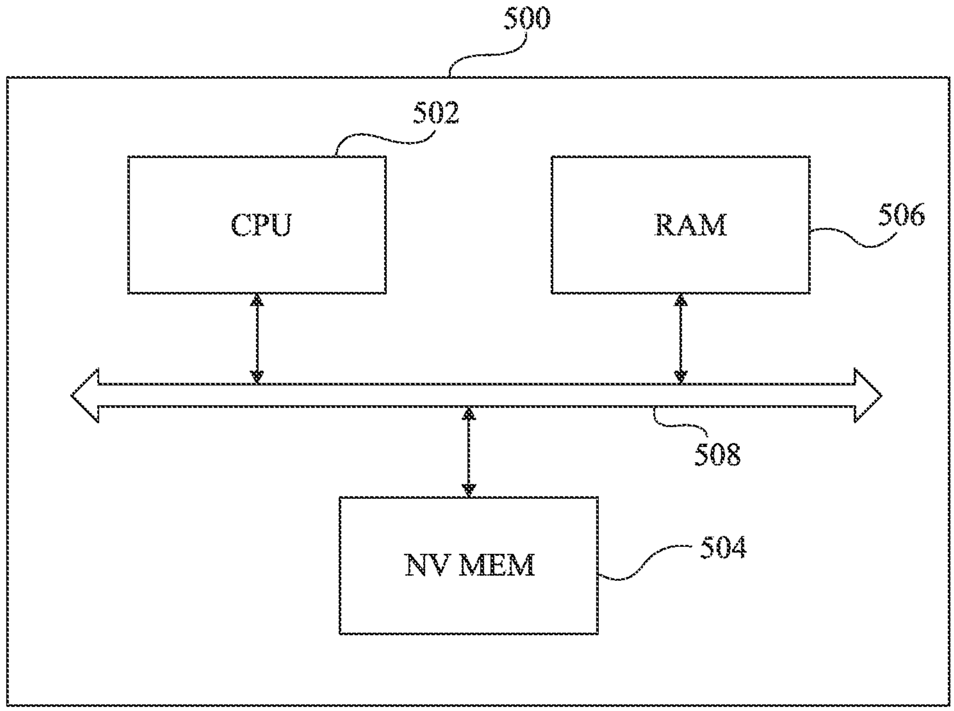
FIG. 5 is a block diagram representing a processing device according to an embodiment of the present description.

FIG. 5 is a block diagram showing a processing device 500 according to an embodiment of the present description. Processing device 500 is for example configured to implement a method of identification of risks of cyberattacks on a programmable logic controller.

Processing device 500 for example comprises a processing unit 502 (CPU), such as a processor, and a non-volatile memory 504 (NV MEM). Processing device 500 for example further comprises a volatile memory 506 (RAM), for example a random access memory.

Processing unit 502 is for example coupled to memories 504 and 506 via a bus 508.

According to an embodiment, non-volatile memory 504 comprises a digital representation of a controller logic, for example in the form of a Grafcet-type or Ladder-type file. Non-volatile memory 504 for example further comprises instructions which, when they are executed by processing unit 502, enable to convert the digital representation of the controller logic into a digital representation of a minimized finite-state transducer.

As an example, a minimized finite-state transducer is generated based on the controller logic of a single programmable logic controller. A general minimized finite-state transducer is then obtained, by processing unit 502, by calculating the cartesian product of all the minimized finite-state transducers. It is indeed less time-consuming to individually minimize a plurality of finite-state transducers, each associated with a single programmable logic controller, rather than minimizing a transducer describing all the controller logic of an entire operational portion. The breaking down into a finite-state transducer for a programmable logic controller is disclosed as an example and is of course not limiting.

As an example, a minimized finite-state transducer is generated, based on a controller logic, due to a computer tool known under name "Teloco" (the name "Teloco" may be protected by one or a plurality of trademarks). An example of use of the "Teloco" tool is for example given in publication "Translating Grafcet specifications into Mealy machines for conformance test purposes" published in Control Engineering Practice, vol. 19, no 9, p. 947 957, sept. 2011 by authors J. Provost, J.-M. Roussel, and J.-M. Faure. The minimizing of the transducer is for example performed by the execution of the Quine-Mccluskey algorithm. The Quine-Mccluskey algorithm enables, for example, to minimize a set of Boolean expressions into a minimum expression.

In relation with the example described in FIGS. 1 and 2, processing unit 502 is configured to generate a digital representation of a first minimized finite-state transducer based on Grafcet 202 and another digital representation of a second minimized finite-state transducer based on Grafcet 204. The cartesian product of the two minimized finite-state transducers then is a minimized transducer for the entire controller logic 200.

As an example, non-volatile memory 504 is further configured to store a first computer file, for example stored as a result of the conversion of the controller logic into at least one minimized finite-state transducer. As an example, the first computer file comprises a subset of the states of the finite-state transducers. In another example, the first file comprises at least one subset of the states of at least one of the finite-state transducers. The states contained in the first file are for example states, previously identified as states being sensitive, or also non-associated with a safety property, that is, states in which the safety of the industrial system is compromised in case of a malicious action.

In the example of FIG. 1, if at least one of pistons P1, P2, or P3 remains in front position, the industrial system is for example endangered, and it is thus effectively a sensitive state. Indeed, the passing of the other boxes will be blocked.

In another example, where an operational portion for example comprises the filling of a tank, a sensitive state is for example that in which a filling valve of the tank is open. Indeed, if the tank is full and the valve remains open, the safety of the system is compromised.

In still another example, a state in which a circuit breaker has not tripped is a sensitive state. Indeed, if the circuit breaker remains operational in the presence of an electrical defect, the system is for example in danger.

As an example, the first file is also configured to store the states previously identified as not being sensitive, or associated with a safety property. For example, the states in which pistons P1 and/or P2 and/or P3 are in back position are states ensuring the system safety.

Similarly, in the example of the tank, a state in which the tank valve is closed is a safe state, and this is also true, in the example of the circuit breaker, for a state where the circuit breaker has tripped.

Figure 6:
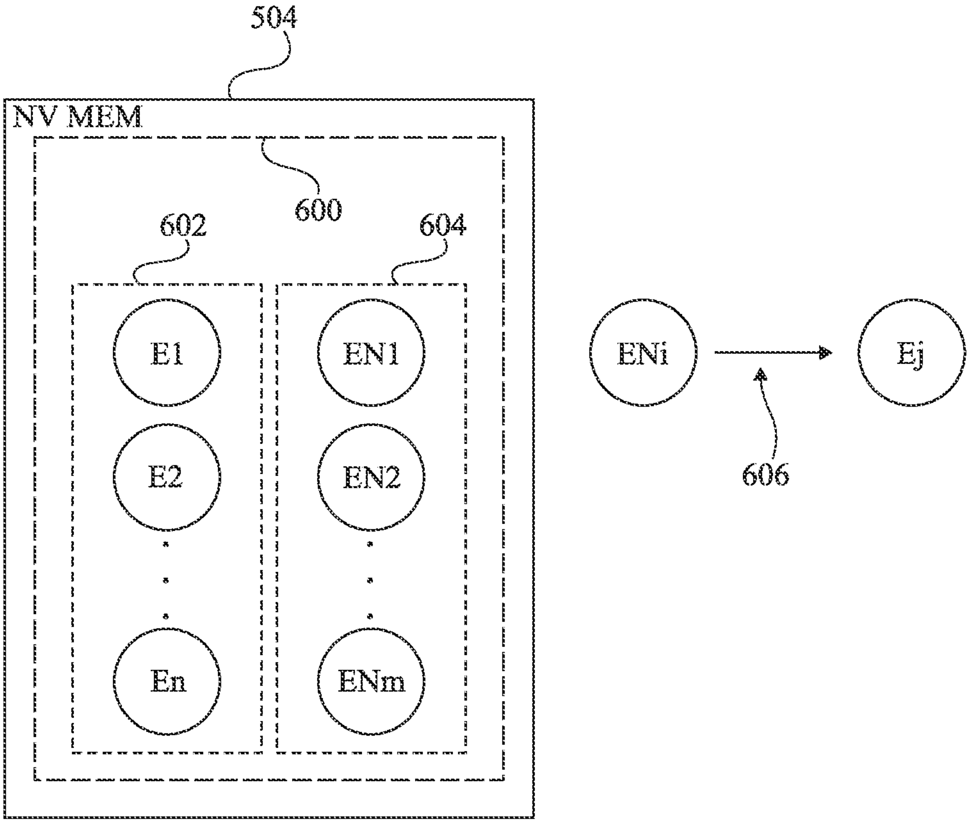
FIG. 6 illustrates an example of search for critical transitions between two states of a finite-state transducer.

FIG. 6 illustrates an example of search for critical transitions between two states of a finite-state transducer.

As an example, memory 504 stores a computer file 600 corresponding to an example of the first computer file described in relation with FIG. 5. Computer file 600 comprises a subset 602 of states E1 to En and a subset 604 of states EN1 to ENm. The states E1 to En and EN1 to ENm of a minimized finite-state transducer, or of a set of minimized finite-state transducers. As an example, states E1 to En are states identified as not being sensitive and states EN1 to ENm are states identified as being sensitive.

According to an embodiment, transitions called critical are identified. The critical transitions are for example transitions which, when they are forced or when they are prevented, compromise the safety of the industrial system. As an example, a critical transition 606 is for example a transition starting from a source state ENj belonging to subset 604, and thus sensitive, and leading to a destination state Ei belonging to subset 602. The identified critical transitions are for example identified by processing unit 502 and then written into a second computer file stored in memory 504. The critical transitions can be distinguished in two types. A first type of critical transitions are transitions from a sensitive state to a non-sensitive state. Indeed, a blocking of the information, for example a malicious attack by blocking, may prevent the transition from being performed and the system remains in the sensitive state while it should transit to the non-sensitive state. A second type of critical transitions are, conversely, transitions from a non-sensitive state to a sensitive state. Indeed, the modification of a data element, for example during an injection attack, may cause this type of transition, leading the system into a sensitive state while it should remain in a non-sensitive state.

More generally, in the source state of a critical transition, a possible attack by blocking of information would leave the system in a sensitive state. In the destination state of a critical transition, a possible injection attack would turn the system back to a sensitive state.

In the example described in relation with FIGS. 1 and 2, the transition from a source state where piston P1 is moved back, to a destination state where piston P1 is moved forward is for example a critical transition.

Figure 7:
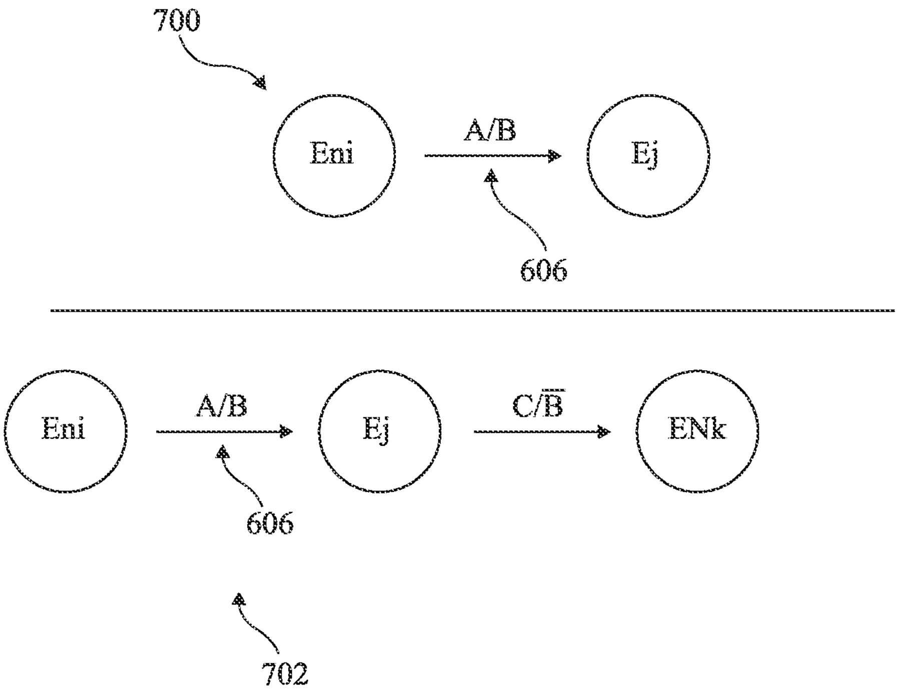
FIG. 7 illustrates examples of behavior of a finite-state transducer.

FIG. 7 shows examples of attacks on the behavior of a controller logic.

A first type of attack, illustrated in diagram 700, is the attack by blocking of information. During an information blocking attack, the refreshment of the value of a variable, or of a set of variables, is prevented. This type of attack causes the inhibition of a transition. If the inhibited transition is a transition identified as critical, the system remains in a state where the safety and the security are compromised.

As an example, the system is at state ENi and the transition to state Ej, a non-sensitive state, is executed when an input variable takes value A and the output value is for example a value B. In relation with the example illustrated in FIGS. 1 and 2, value B for example corresponds to an output such as AV_P1, AV_P2 etc.

If the transducer remains unintentionally blocked in state ENi, while in normal operation transition 606 should be triggered, the safety of the industrial system is then compromised. For example, piston P1 remains in front position while the box has been sent on one of belts T2 or T3 and other boxes on belt T1 are then blocked by piston P1.

State ENi is then identified as sensitive since the safety of the system risks being compromised if the system remains in this state while transition 606 should be triggered. Indeed, if an attacker blocks the value of the variable at non-A, the system remains at state ENi and the transition to non-sensitive state Ej is not executed.

A second type of attack, illustrated in diagram 702, is the attack by data injection, or information injection. During an injection attack, the value of an input variable or of a set of variables, is falsified. This type of attack forces a transition to be executed. If the destination state of the forced transition is a sensitive state, the system enters a state where the safety and the security are compromised.

In the example illustrated in diagram 702, when the transducer is at state Ej, a data injection, for example by modifying the value of an input variable so that it is equal to C, is performed. A transition to a destination state ENk is then forced. As an example, the output of the forced transition is different from value B, implying an action, for example the opening of a valve, setting the system to a sensitive state.

According to an embodiment, as a result of the identification of the critical transition, the data having their blocking causing the inhibition of an identified transition or a modification or a falsification of which causes the execution are in turn identified by processing unit 502 and are added in the second computer file. As an example, a list of data, said to risk being compromised, is associated with each critical transition identified in the second file.

In the example illustrated in FIGS. 1 and 2, variables P2_FRONT and P3_FRONT for example form part of the variables identified as risking being compromised. Indeed, their switching from FALSE to TRUE implies, in the controller logic, the moving back of piston P1 and the next boxes may accumulate and be blocked.

Figure 8:
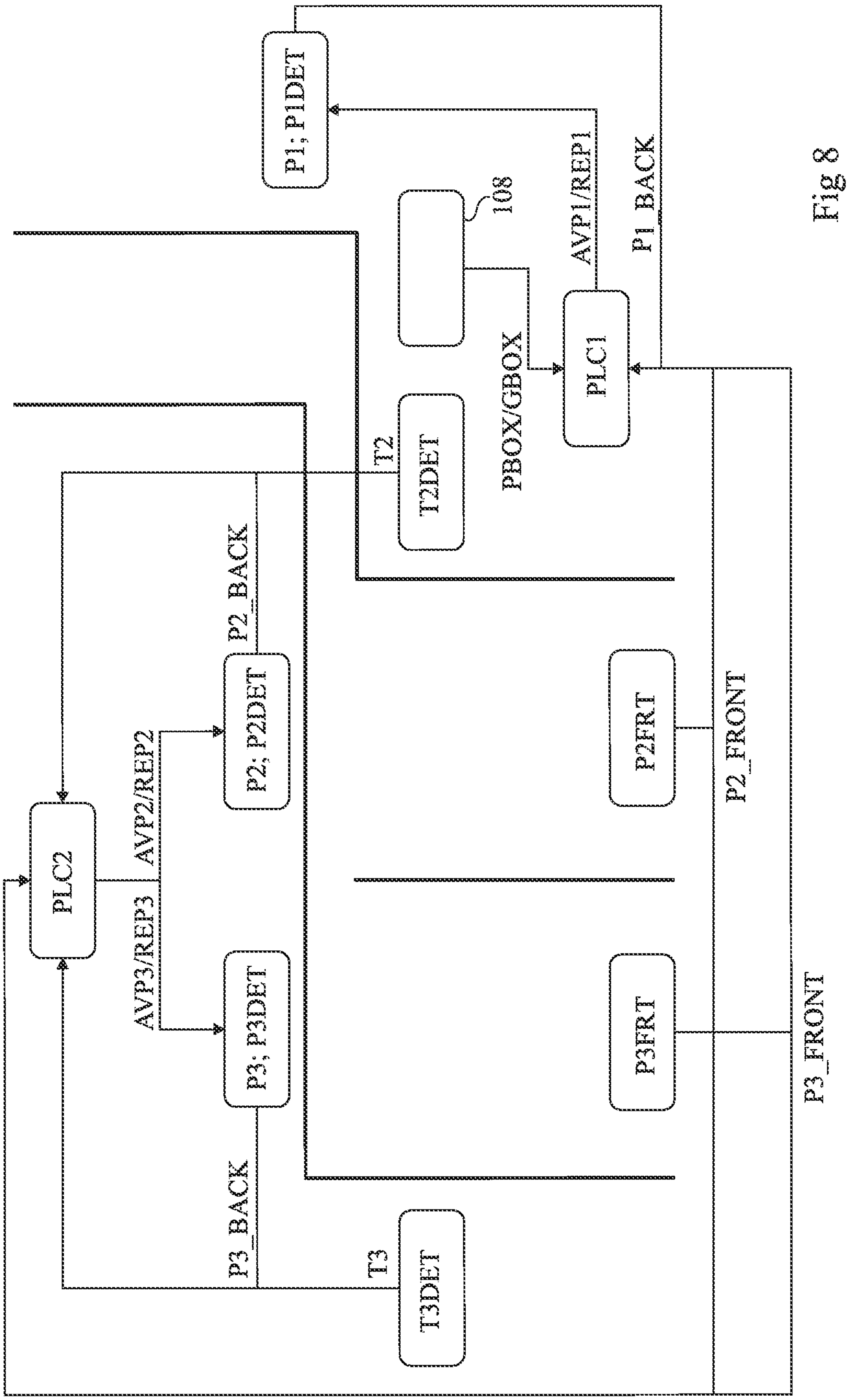
FIG. 8 is a diagram of the data exchanged between sensors and programmable logic controllers.

FIG. 8 illustrates an example of data exchanged between a sensor and a programmable logic controller. More particularly, FIG. 8 illustrates an example of the data exchanged between sensors 108, P1DET, P2DET, P3DET, P2FRT, P3FRT, T1DET, and T2DET and two programmable controllers PLC1 and PLC2 for example controlled by the controller logics 202 and 204 described in relation with FIG. 2.

As an example, detectors P2FRT and P3FRT transmit data, for example the value of variables P2_FRONT and P3_FRONT, to the two programmable logic controllers PLC1 and PLC2. Detector 108 for example transmits the values of Boolean variables PBOX and GBOX to programmable logic controllers PLC1 and PLC2. Programmable logic controller PLC1 controls the action of piston P1 based on the values of variables PBOX and GBOX and programmable logic controller PLC2 controls either the detection by sensor P2FRT, or by sensor P3FRT, according to the size of the box.

As an example, sensor P1DET only exchanges data with programmable logic controller PLC1, controlling the operation of piston P1.

The graphic representation of the data exchanged between the different sensors and the different programmable logic controllers allows, for example, the identification of the variables transiting through non-secure channels. These variables are then subject to blocking or to falsification.

Figure 9:
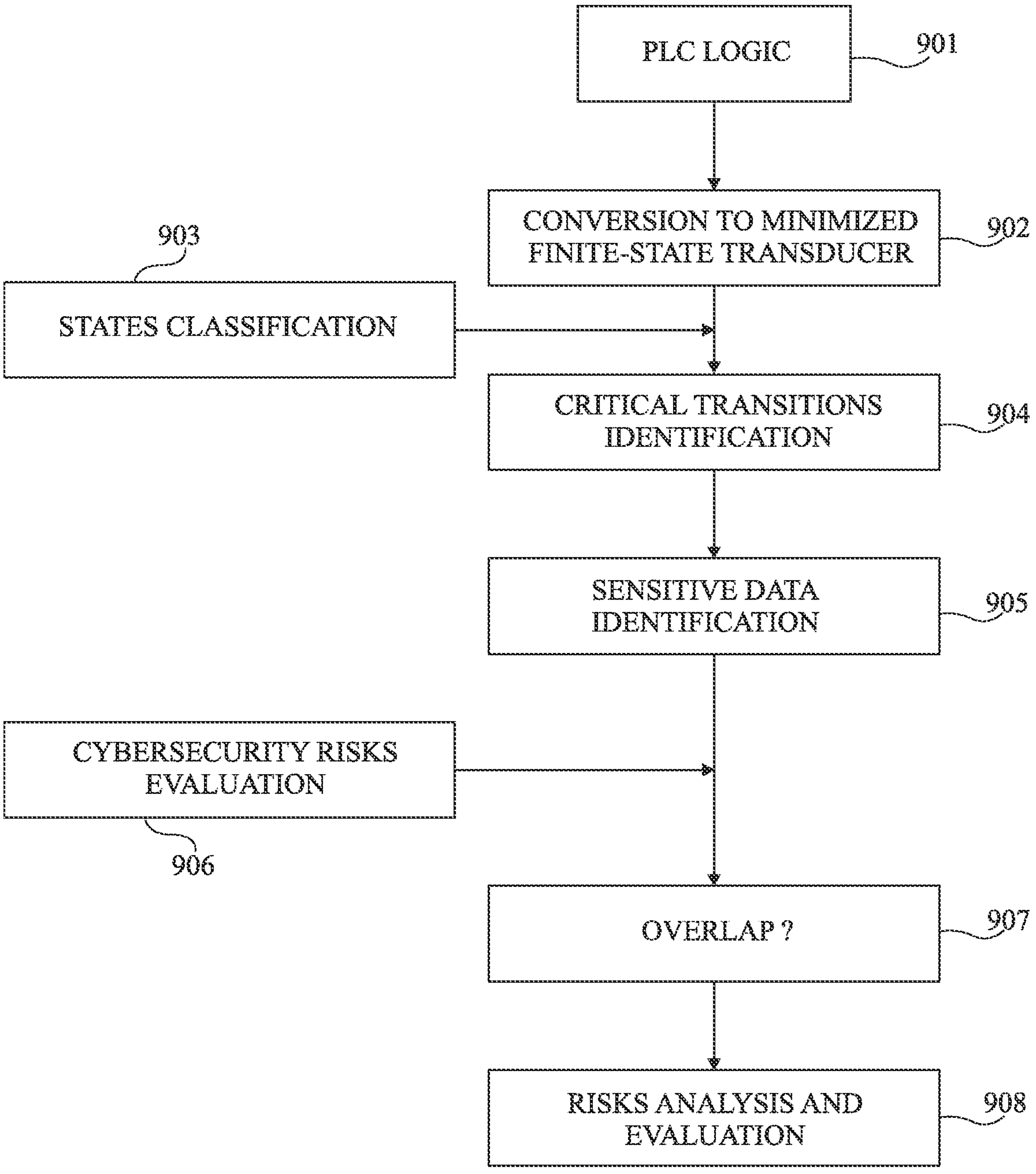
FIG. 9 is a flowchart showing different steps of a method of identification of risks of cyberattacks on a programmable logic controller, according to an embodiment of the present description.

FIG. 9 is a flowchart showing different steps of a method of identification of risks of cyberattacks on a programmable logic controller, according to an embodiment of the present description. This method is for example implemented by the processing device of FIG. 5.

At a step 901 (PLC LOGIC), a digital representation of a controller logic controlling one or a plurality of programmable logic controllers of an industrial system is generated. As an example, the digital representation takes the form of one or a plurality of diagrams of Grafcet type or of Ladder type.

At a step 902 (CONVERSION TO MINIMIZED FINITE-STATE TRANSDUCER), the digital representation(s) of the controller logic are converted, for example by processing unit 502, into one or a plurality of minimized finite-state transducers, which are digital representations also stored in memory 506. As an example, the generated transducer(s) are Mealy machines, generated by processing unit 502 based on the Teloco tool and are minimized based on an execution of Quine-Mccluskey's algorithm. As an example, two states of each finite-state transducer are coupled by a set of possible Boolean combinations. In the example illustrated in FIGS. 1 and 2, the states of the minimized finite-state transducer are for example coupled by the concatenation of the values of the Boolean variables recorded by the different sensors, such as PBOX and GBOX, P2_FRONT and P3_FRONT, P1_BACK etc.

At a step 903 (STATES CLASSIFICATION), a computer file containing classifications of the different states of the minimized finite-state transducer(s) is for example received by processing device 500, and for example stored in memory 504 or 506. This classification has for example been performed by a safety expert.

The classification identifies a subset of states for which a safety property of the industrial system is for example not ensured. As an example, these states are identified as being sensitive. As an example, in these states, the safety of the system is at risk of being compromised.

As an example, the classification also identifies another subset of states for which the industrial system is safe and has no, or only a slight, risk of incident or of accident. As an example, these states are identified as not being sensitive and are for example associated with a safety property.

The subsets of states, as well as the other subset of states, are for example contained in the first computer file, stored in memory 504 or 506.

At a step 904 (CRITICAL TRANSITIONS IDENTIFICATION) the transitions of the finite-state transducer(s) for example starting from a source sensitive state to a destination non-sensitive state are identified, for example by processing unit 502. As an example, processing unit 502 further identifies transitions towards a destination sensitive state. The identified transitions are for example called critical and are written into a second computer file, for example stored in memory 504.

At a step 905 (SENSITIVE DATA IDENTIFICATION), the input data which, if blocked or falsified, inhibit or cause a critical transition, are identified for example by processing unit 502. As an example, the identified input data are written into the second computer file, in association with the critical transitions.

According to an embodiment, each identified data element is stored in association with an indication value indicating whether a blocking of the data element inhibits a critical transition or if a modification of its value forces the execution of a critical transition. As an example, the indication value is coded over two bits. The most significant bit takes, for example, value 1 if a modification of the value forces the execution of a critical transition and the least significant bit takes, for example, value 1, if a blocking of the value inhibits a critical transition. Indeed, an injection is based on a data modification and the blocking of information is based on a denial, or the modification of a data element uses a greater privilege than a denial. A blocking is then associated with a value greater than or equal to 1(01-10) and an injection is associated with a value greater than or equal to 2(10-11). As an example, value 10 is meaningless since a modification allows a denial. In another example, the blocking is coded on the most significant bit. This coding over 2 bits is given as an example of implementation and is of course non-limiting.

At a step 906 (CYBERSECURITY RISKS EVALUATION), an evaluation of cybersecurity risks on the operational portion is performed. As an example, the risk evaluation is performed by using a Microsoft Threat Modeling Tool enabling to generate a data flow diagram (DFD), for example in the form of the graph illustrated in relation with FIG. 8. The generated diagram enables a cybersecurity expert to identify the data transiting over non-secure channels, accordingly likely to be blocked and/or falsified.

As an example, the data identified at step 906 are written into a third computer file, stored in memory 504.

At a step 907 (OVERLAP?), processing unit 502 is configured to determine, for example, which data belong to both the second and to the third computer files. The common data are for example stored in a fourth computer file. As an example, the data are stored in association with the indication value being associated therewith in the second file.

At a step 908 (RISKS ANALYSIS AND EVALUATION), the risk(s) for the industrial system in case of an attack on at least one data element are analyzed and evaluated.

As an example, for each data element, the risk analysis and evaluation comprises the determination of a consequence. The consequence for example corresponds to the occurring of a feared event. The feared event is for example an event capable of occurring when the transducer is in a sensitive state. For example, the accumulation of boxes on a conveyor belt, the overflowing of a filling tank or a fire, for example starting if an electric defect occurs and a circuit breaker remains closed.

As an example, for each feared event, a probability of occurrence is calculated. For example, probability P is equal to 1/nbr_entree, value nbr_entree corresponding to the number of input variables to be corrupted for the feared event to be able to occur.

As an example, a risk level for the feared event is then evaluated. For each event, a consequence value Cons is determined, for example in the form of a score between 0 and 10 or between 0 and 100 corresponding to the severity of the event. For example, the consequence value for an accumulation of boxes on a conveyor belt has a lower score than a fire. The risk level R of an event is for example equal to the product of the consequence value and of the probability of occurrence of the event.

As an example, an evaluation of the risks for an industrial system comprises a set of scenarios S, each scenario $n \in S$ for example describing a feared event, each scenario being for example associated with a probability and a risk level $R_n$.

An advantage of the described embodiments is that they enable to evaluate risks based on a security analysis of an industrial system and on an analysis of cybersecurity risks.

Various embodiments and variants have been described. Those skilled in the art will understand that certain features of these various embodiments and variants may be combined, and other variants will occur to those skilled in the art.

Finally, the practical implementation of the described embodiments and variants is within the abilities of those skilled in the art based on the functional indications given hereabove. In particular, as concerns the conversion of the controller logics into minimized finite-state transducers.

What is claimed is:

1. A method of identification of risks of cyberattacks on a programmable logic controller, the method being implemented by a data processing device comprising a processing unit and a memory, the method comprising:

generating, by the device, a digital representation of a minimized finite-state transducer based on a specification of a controller logic of the programmable logic controller, the minimized finite-state transducer comprising a set of source states, a set of destination states, and a set of transitions, each transition starting from a source state to a destination state based on a input data value;

generating and storing into the memory of a second computer file, based on a first computer file comprising a subset of sensitive states among the set of states, the second computer file comprising a list of critical transitions associated with the sensitive states, and for each transition, a list of the input data; and generating and storing into the memory of a fourth computer file, based on a third computer file indicating the presence or not of a risk of corruption on at least each input data element contained in the second computer file, each identified risk associated with an element of the second file taking the form of an indication value coded over at least 2 bits in the third file, the fourth computer file indicating, among the input data, input data to be protected which are both associated with critical transitions and with a risk of corruption, these input data being at risk for a cyberattack, the value of a bit of the indication value indicates whether a blocking of the value of the input data element inhibits a transition among first transitions and the value of another bit of the indication value indicates whether a modification of the value of the input data element causes a transition among second transitions.

2. The method according to claim 1, wherein the generation of the second computer file comprises:

identifying in the digital representation of the minimized finite-state transducer, by a processing unit of the device, the first transitions from a source state not identified as sensitive, in the first computer file, to a destination state identified as sensitive; and writing the first transitions into the second computer file.

3. The method according to claim 2, wherein the generation of the second computer file further comprises:

identifying in the finite-state transducer, by the processing unit, the second transitions from a source state identified as sensitive in the first computer file to a destination state not identified as sensitive; and writing the second transitions into the first computer file.

4. The method according to claim 2, wherein the generation of the second computer file further comprises:

for each first transition, identifying, by the processing unit of the device, in the digital representation of the minimized finite-state transducer, first input data having a blocking of their value inhibiting the transition to the associated destination state; and writing the first input data into the second computer file.

5. The method according to claim 4, wherein the generation of the second computer file further comprises:

identifying in the finite-state transducer, by the processing unit, of second transitions from a source state identified as sensitive in the first computer file to a destination state not identified as sensitive;

writing the second transitions into the first computer file; and for each second transition, identifying in the digital representation of the minimized finite-state transducer, of second input data having the modification of their value, in the associated source state, causing said second transition.

6. The method according to claim 1, wherein a least significant bit of the value indicates whether a blocking of the value of the input data element inhibits a transition among the first transitions and a most significant bit indicates whether a modification of the value of the input data element causes a transition among the second transitions.

7. The method according to claim 1, further comprising a risk analysis, the analysis comprising, for each element of the fourth computer file:

identifying, by the processing unit, a feared event occurring in case of an attack on the element;

calculating, by the processing unit, a probability of occurrence of the event;

determining, by the processing unit, a level of the risk based on a consequence value of the event and on the probability.

8. The method according to claim 7, wherein the probability of a feared event is equal to an inverse of a number of elements of the fourth computer file for which the feared event is identified.

9. The method according to claim 7, wherein the risk level of a feared event is equal to a product of the probability of the event and of its consequence value.

10. A non-transient memory configured to store instructions configured to implement the method of identification of cyberattack risks of claim 1 when they are executed by a processing unit.

11. A data processing device comprising a processing unit and a memory, the device being configured to implement the method of identification of cyberattack risks of claim 1.

* * * * *